US009044130B2

(12) United States Patent
Lölsberg

(10) Patent No.: US 9,044,130 B2
(45) Date of Patent: Jun. 2, 2015

(54) CLEANING DEVICE FOR A PORTIONING UTENSIL

(76) Inventor: Bernd Lölsberg, Kürnach (DE)

( * ) Notice: Subject to any disclaimer, the term of this patent is extended or adjusted under 35 U.S.C. 154(b) by 152 days.

(21) Appl. No.: 13/390,660

(22) PCT Filed: Aug. 2, 2010

(86) PCT No.: PCT/DE2010/000904
§ 371 (c)(1),
(2), (4) Date: Feb. 15, 2012

(87) PCT Pub. No.: WO2011/020455
PCT Pub. Date: Feb. 24, 2011

(65) Prior Publication Data
US 2012/0186610 A1 Jul. 26, 2012

(30) Foreign Application Priority Data
Aug. 19, 2009 (DE) .......................... 10 2009 038 042

(51) Int. Cl.
*A47L 17/00* (2006.01)
*A23G 9/30* (2006.01)
*A47L 15/00* (2006.01)

(52) U.S. Cl.
CPC . *A47L 17/00* (2013.01); *A23G 9/30* (2013.01); *A47L 15/0086* (2013.01)

(58) Field of Classification Search
CPC ....................................................... A47L 17/00
See application file for complete search history.

(56) References Cited

U.S. PATENT DOCUMENTS

| 2,665,440 A | 1/1954 | Starcevich |
| 4,804,006 A * | 2/1989 | Shaw ............................ 134/177 |
| 2003/0131426 A1 * | 7/2003 | Schulling ........................ 15/21.1 |

FOREIGN PATENT DOCUMENTS

| DE | 506 786 | 9/1930 |
| DE | 32 13 488 | 10/1983 |
| DE | 3213488 A1 * | 10/1983 |
| DE | 20 2005 015103 | 2/2006 |
| EP | 0 838 158 | 4/1998 |
| EP | 2 006 035 | 12/2008 |
| FR | 2 425 833 | 12/1979 |
| FR | 2 657 276 | 7/1991 |
| GB | 309878 * | 4/1929 |
| GB | 2142224 A * | 6/1984 |
| GB | 2 142 224 | 1/1985 |

OTHER PUBLICATIONS

The International Search Report as mailed on Apr. 27, 2011 for International Application No. PCT/DE2010/000904.

* cited by examiner

*Primary Examiner* — Michael Barr
*Assistant Examiner* — Jason Riggleman
(74) *Attorney, Agent, or Firm* — Quarles & Brady LLP

(57) ABSTRACT

The invention relates to a cleaning device for a portioning utensil used for portioning ice cream or the like, which can be used in a receptacle. Cleaning fluid being fed to a valve support can be conducted through at least two rinsing rods and can be discharged via nozzles being located on the rinsing rods. An actuation mechanism switches a valve within the valve support. In order to be able to optimally clean the receptacle and the cleaning device, it is proposed to insert a splash guard separately into the receptacle and/or to design the rinsing rods such that the same can be detached, especially by hand.

21 Claims, 10 Drawing Sheets

CLEANING DEVICE FOR A PORTIONING UTENSIL

CROSS-REFERENCE TO RELATED APPLICATIONS

This application represents the national stage entry of PCT International Application No. PCT/DE2010/000904 filed on Aug. 2, 2010 claims the benefit of German Patent Application No. DE 10 2009 038 042.6 filed Aug. 19, 2009. The contents of both of these applications are hereby incorporated by reference as if set forth in their entirety herein.

The present invention relates to a cleaning device for a portioning utensil, in particular spoons having corresponding bowls, spatulas, scrapers, scoops or the like, for portioning ice cream.

For the purpose of cleaning an ice-cream portioning utensil, in the simplest case it is known to swing the same back and forth through a rinsing tank filled with water or to rub it against brushes being arranged therein in order to remove ice cream adhering thereto to enable utilization in the next portioning process. In this context, it is a disadvantage that the rinsing water in the receptacle is rapidly contaminated and thus has to be exchanged frequently. Moreover, a continuous flow of water results in high water consumption.

From the state of the art disclosed in document DE 20 2005 015 103 U1 a cleaning device for vessels, for instance drinking glasses and/or cups, is known, which has a base body featuring at least one connection for a pressurized cleaning fluid. A rinsing body is connected to said base body via a valve, wherein the valve is opened via a curved, rod-shaped activation device which is pressed down by means of a glass rim and thus opens the valve. It is a disadvantage of this device that the structure and geometry thereof are hardly suitable for the purpose of cleaning portioning utensils, in particular since the water is sprayed from the bottom to the top.

Another example of a cleaning device for the purpose of cleaning glasses is shown in laying-open publication DE 506 786 A. Here, a vertically displaceable arrangement having several outer rinsing rods and one inner rinsing rod is provided within a round receptacle which is open at the top, wherein cleaning fluid can be sprayed onto a glass via respective nozzles. The whole arrangement at the same time constitutes an actuating element which activates a valve being connected thereto by executing a pressing down movement.

Patent document U.S. Pat. No. 2,665,440 A discloses another cleaning device for glasses. Comparable to the previous solution, several rinsing rods having nozzles being disposed so as to surround the glass to be cleaned, and nozzles for cleaning the inside of the glass are provided. In this case, the actuating element is formed as a centrally disposed ball which activates a valve being connected thereto when a pressing down movement is executed.

Document DE 32 13 488 A1 discloses a cleaning device for portioning utensils which has two rinsing rods each exhibiting a vertically disposed nozzle being arranged at the ends of the same. The portioning utensil can be inserted into the center between said downwardly and upwardly directed nozzles. The dispensing of the cleaning fluid from the nozzles is triggered by an actuating element which is centrally disposed below the nozzles. By means of applying a pressure, said actuating element together with the portioning utensil to be cleaned can be moved toward the lower nozzle, and as a consequence, a valve is opened via a lever mechanism. For the purpose of protection against splashing water originating from the cleaning location, the receptacle is configured so as to be largely closed and merely has a lateral opening intended for the insertion of the portioning utensil.

Comparable to the previously described embodiment, patent document EP 0 838 158 B1 discloses a cleaning device, wherein the actuating element is disposed centrically with respect to the lower nozzle. This measure improves the usability of the cleaning device, since in the previously described embodiment, the actuating element can only be activated if a specific portioning utensil is used. Here, the shape of the portioning utensil is now immaterial.

Even though different advantageous solutions for the purpose of cleaning portioning utensils are disclosed in the state of the art, in said solutions the hygiene-related problem is not heeded at all. It is generally known that the cleaning device itself must be cleaned regularly. In this context, it is of essential relevance that dirt, residual food particles or bacteria do not remain adhered to the cleaning device. For this purpose, the state of the art only provides the option to flood the cleaning device with aggressive cleaning agents and to subsequently empty the cleaning device. Due to the fact that the cleaning device is used in the food sector, this aspect in turn is undesirable, since potential residues of the aggressive cleaning agent may be transferred to the portioning utensil. In addition, this aspect represents an ecological burden which should increasingly be eliminated.

Starting from this state of the art, it is the objective of the present invention to provide a cleaning device for a portioning utensil by means of which the disadvantages encountered in the state of the art can be overcome, and in particular, by means of which an especially simplified cleaning process of the device itself can be realized.

The cleaning device for a portioning utensil in a manner known per se firstly serves the purpose of cleaning for instance spoons having corresponding bowls, wherein the term "bowl" denotes the spoon bowl and is perhaps best known to come in a hemispherical shape. Frequently, especially in Italy, the ice cream is skilfully put into an ice-cream wafer using spatulas, wherein spatulas, scrapers and scoops, from a purely technical point of view, basically constitute equivalents. The cleaning device can be inserted into a receptacle, wherein for the purpose of arrangement, basically not only the position in the receptacle, in particular with a view to potential connections, is taken into account. A receptacle intended for the use of the inventive solution, as a general rule, will be designed as a type of rinsing tank. However, in this regard, the shape and size of the receptacle are initially immaterial. By the same token, it is conceivable to place the inventive device onto an even surface which is suitable for enabling a controlled discharge of the cleaning fluid.

According to the fundamental idea of the invention, the cleaning device is composed of at least two rinsing rods, the shape and size thereof being adaptable to the portioning utensil to be cleaned, and at least one nozzle, via which the cleaning fluid can be dispensed, is respectively connected thereto or else is integrated therein. The utilization of at least two rinsing rods and thus of at least two nozzles in total makes it possible to spray and clean an inserted portioning utensil from different directions. It is another advantage that the inserted portioning utensil must be retained only in one specific region of the cleaning device.

Moreover, the cleaning device comprises a valve support which can be mounted in an opening in the receptacle. In this context, the alignment of the valve support in the receptacle wall, respectively in the receptacle bottom, is immaterial. The valve support at least penetrates through the receptacle wall, respectively the receptacle bottom, and enables the cleaning fluid to be supplied from the outside to the inside of the receptacle. As a consequence, it is necessary to connect a cleaning fluid supply at the valve support on the outside of the receptacle.

A valve fulfilling a designated function, i.e. by means of which the flow of cleaning fluid can be controlled, is provided in the valve support. The rinsing rods are in communication with the valve support and are directly or indirectly connected thereto. Thus, when the valve is activated, a flow of cleaning fluid from the inlet through the valve support to the rinsing rods and out of the nozzles is enabled.

In the embodiment being advantageous for the intended use, the valve is closed in its initial position in the absence of actuation, and is only opened in response to an external actuation.

An actuating element is in functional communication with the valve. Thus, the actuating element controls the flow through the valve support. The type of the actuating element is initially irrelevant and is in essential for the implementation of an inventive embodiment.

In a first embodiment according to the invention, provision is made for the cleaning device comprising a splash guard. In this context, the splash guard can be separately inserted into the receptacle and is not part of the receptacle. In this regard, it should also be deemed to be understood that the splash guard can be mounted and removed by hand, particularly without the use of a tool.

It is a matter of course that the geometry is basically optional, wherein for the purpose of realizing the functionality of a splash guard, according to the invention provision is made for the splash guard defining or forming a cleaning chamber. In this regard, the cleaning chamber is delimited partly by the splash guard. According to the utilization in a receptacle, it is thus not necessary that the same features a bottom wall, which is conventionally provided by the receptacle for delimiting the cleaning chamber. Moreover, the splash guard can be disposed so as to be raised above the receptacle bottom, provided that the receptacle itself ensures the anti-splash functionality in the distance between the splash guard and the bottom. According to the object of the invention, the splash guard is disposed so as to surround the rinsing rods and the portioning utensil located in the cleaning region. In this regard, it is of essential relevance that at least the rinsing rods are covered by the splash guard in the regions of the discharge openings, so that the produced splash water is prevented from entering the environment.

It is necessary to provide an insertion opening in the splash guard for the insertion of the portioning utensil.

By means of the newly created splash guard, it is for the first time possible on the one hand to provide a particularly effective protection against splashing cleaning fluid and, at the same time, to realize the required accessibility for the purpose of cleaning the cleaning device itself and the receptacle when the splash guard is removed. In this way, an increased level of hygiene can be attained without the need for the aggressive cleaning agents which would otherwise be utilized.

As a matter of course, there are no restrictions whatsoever as to the location where the portioning utensil is to be inserted into the cleaning device, however, it has proven to be particularly advantageous if the insertion opening is realized so as to be disposed on the upper surface of the splash guard above the actuating element.

Moreover, as regards the efficiency of the splash guard, it is particularly advantageous if the insertion opening intended for the insertion of the portioning utensil has a collar which points into the cleaning chamber. Hence, the insertion opening preferably is designed as an insertion funnel. Moreover, when designing the insertion opening, it is advantageous if the size and shape are adapted to the portioning utensil to be cleaned. Thus, an opening should be selected so as to be slightly larger than the potentially differently dimensioned portioning utensils.

Consequently, an object to be rinsed is advantageously allowed to easily reach the region which is flooded with the cleaning fluid subsequent to the activation of the actuating element without becoming jammed therein, while maximum protection against splashing cleaning fluid is still ensured.

From practical applications it is known that the use of a cleaning device simultaneously requires a location where the cleaned portioning utensil can be stored for the next application. In this context, it is desirable if said location lies in the proximity of the cleaning device. Thus, the inventive embodiment providing the splash guard is particularly advantageous if the same features storing means for the portioning utensil. In this context, provision is made for the portioning utensil being storable within the receptacle so as to be separated from the cleaning chamber and so as to be placed at a distance from the bottom of the receptacle. Hence, the portioning utensil can be directly stored subsequent to the cleaning process without the need to search for a storage location. Thus it is ensured that the clean portioning utensil is not contaminated again by splashing cleaning fluid. By the same token, residual fluid is allowed to drip off from the portioning utensil into the receptacle without the need for collecting the dripping fluid at another location.

In a first alternative, it is advantageously possible to form the storage means by suspension elements. Hence, it is possible to store the portioning utensil in a suspended fashion at the splash guard on the outside of the cleaning chamber. Thus, it is ensured that the discharged cleaning fluid is allowed to completely drip off. The selection of said embodiment is particularly advantageous, provided that the portioning utensil features a shape being suitable for this purpose. Embodiments being suitable for this purpose, such as hooks, are readily apparent for the skilled person and an explanation will be omitted here.

In a second alternative, it is advantageously possible to form the storage means by supporting elements. Hence, it is possible to store the portioning utensil in a vertical fashion at the splash guard outside of the cleaning chamber. In this case, the comfort level during use of the storage means is particularly high, since the user is enabled to store and retrieve the portioning utensil again virtually without the need for even having to look at the same. Embodiments being suitable for this purpose may be grids, metal sheets, grates or the like and are equally readily apparent for the skilled person and will not be explained here.

Depending on the shape of the receptacle, it is particularly advantageous if the splash guard partly has a shape which conforms to the inside of the receptacle, and is centered in the receptacle. Since the rinsing rods are positioned relative to the receptacle via the valve support, by means of the centering of the splash guard in the receptacle the positioning of the splash guard relative to the rinsing rods can be attained as well. This embodiment is particularly preferable if the whole arrangement is configured so as to be disposed centrally with respect to the receptacle. It is obvious that the centering process in the receptacle requires only few contact points or two contact faces being opposed to each other and, as a rule, being slightly curved. Thus, various options are available for said realization.

However, it is particularly advantageous if additionally the available supporting elements are partly formed such that the same enable the centering process in the receptacle.

The embodiment of the splash guard is basically immaterial, whereby as a matter of course, design-related requirements are taken into account. A preferred exemplary embodiment makes provision for the splash guard having at least one recess, the cross-section thereof essentially corresponding to that of the rinsing rod. This enables in particular a positively fitted accommodation of the rinsing rod in the recess of the splash guard. If the rinsing rods are configured so as to be largely identical, i.e. so as to be at the same height, each rinsing rod requires a corresponding recess, while the upper surface of the splash guard needs to be flat. The splash guard can easily be push-fitted onto the region to be covered by the same, whereby the rinsing rod, in addition to its functionality as a rinsing element, serves as a centering mechanism for the splash guard. By means of this solution, a centering of the splash guard relative to the rinsing rods is realized. Hence, the shape of the receptacle is irrelevant, wherein the cleaning chamber formed by the splash guard in any case needs to be placed optimally with respect to the rinsing rods.

Alternatively, it is preferably possible to make provision for indentations instead of recesses. Said indentations are equally selected such that they can be placed onto the rinsing rods and thus are equally adapted to the shape of the same. Moreover, gaps which would have a negative bearing on the protective effect are not created between the recesses in the splash guard and the rinsing rods. In this regard, it is irrelevant whether the indentations lie flush with the upper surface of the splash guard or are positioned above or underneath the same. In any case, it is relevant in this solution that, just like in the previous embodiment having the recesses, a lateral guidance of the splash guard is enabled by the indentations. Hence, the indentations can virtually be designed in the shape of a hat, but can be equally designed as an inwardly pointing sleeve. Thus, this embodiment enables a particularly simple design of such cleaning devices and for this purpose ensures an advantageous positioning of the splash guard. Here, in contrast to the embodiment with the recesses, the embodiment wherein the splash guard is still supported on the rinsing rods is particularly advantageous. Thus, no further support of the splash guard in the receptacle is required.

It is also particularly advantageous if the splash guard is completely or at least largely placed at a distance from the receptacle bottom. The reason for this aspect can be seen in that waste water contained in the receptacle is prevented from becoming deposited on the wall of the splash guard. This can be realized optionally by the centering of the splash guard by means of the indentations on the rinsing rods. By the same token, in the solution using the centering in the receptacle, the same can be realized in the case of a conical receptacle such that in the case of a lateral arrangement of the splash guard, the necessary bottom distance is maintained in the receptacle. Moreover, provision can also be made for supporting elements being attached to the splash guard, said supporting elements standing upright on a small surface on the receptacle bottom and further ensuring the advantageous distance of the splash guard from the receptacle bottom.

In a second embodiment, according to the invention, provision is made for the rinsing rods being detachable from the valve support. Within the meaning of the invention, a connection is understood to be detachable if basically largely any person operating the cleaning device is capable of severing the connection of the rinsing rods with the valve support without the need for carrying out any further disassembly measures, subsequent to the removal of the splash guard where appropriate. Here, in particular, provision is made for the rinsing rods being removable by hand. This means that it is possible to sever the connection without the need for making use of a tool.

By means of this solution, for the first time it is possible to remove the rinsing rods from the receptacle to perform the cleaning process. By means of this measure, on the one hand, the improved cleaning of the rinsing rods themselves is enabled and, on the other hand, the accessibility of the receptacle for the purpose of cleaning the receptacle as well as the fixedly mounted assembly is markedly enhanced vis-à-vis the state of the art.

It is particularly advantageous if a transverse connector which conducts the cleaning fluid is disposed between the valve support and the rinsing rods. Hence, the transverse connector firstly fulfils the same function as the rinsing rods, i.e. conducting the cleaning fluid. The fundamental difference can be seen in that the rinsing rods lead to the nozzles or contain the same and have a shape and position which is selected so as to conform to the portioning utensil to be cleaned. By contrast, the transverse connector is intended for connecting the valve support to the rinsing rods.

In this regard, it is initially irrelevant whether one transverse connector is employed for each rinsing rod as a separate component, or whether one transverse connector simultaneously realizes the connection to several rinsing rods, wherein preference is given to the second alternative.

In the consistent implementation of the inventive concept, it is thus advantageous if each rinsing rod is detachably affixed to the one, respectively the several, transverse connectors and the transverse connector in turn is detachably affixed to the valve support.

By means of this implementation, subsequent to the removal of the one, respectively the several, transverse connectors and the rinsing rods, merely the upper region of the valve support, where appropriate with the actuation mechanism thereof, remains within the receptacle, which can thus be cleaned in a particularly simple and thorough manner. Regions which have hitherto been inaccessible are eliminated and aggressive cleaning agents are not needed in order to satisfy the necessary hygienic requirements.

The solution can be realized in a particularly advantageous manner if the rinsing rods are attached to the transverse connector and/or if the transverse connector is attached to the valve support by means of a push-fit connection. Here, provision can advantageously be made for a thread lock, wherein said thread lock in turn needs to be realized so as to be detachable by hand.

Alternatively, further fastening options can also be considered. Here, for instance a bayonet catch or a securing pin, which can be mounted in a simple manner, can be employed.

The underlying objective is attained in particular if both inventive embodiments are combined together. Thus, it is obvious for the skilled person that advantageous realizations of the first and the second embodiment explained above can be combined in the same fashion.

Advantageously, a non-return valve is provided as an additional feature. Said non-return valve needs to be installed in the flow of the cleaning fluid in such a manner that a free flow of the cleaning fluid from the inlet of the valve support to the nozzles is enabled, while a backflow of fluid filled into the receptacle through the nozzles or an open connection between the transverse connector and the rinsing rod toward the valve support is prevented. Thus, mixing of the cleaning fluid with waste water is prevented. In particular when the receptacle is filled with water, contamination, in particular of the inside of the valve support, is prevented when the cleaning device is deactivated.

For these purposes, the assembly can be realized at different locations. On the one hand, it is possible to make provision for an individual non-return valve being disposed upstream or else downstream of the valve. By the same token, it is possible to employ one non-return valve within the cleaning device for each rinsing rod. Here, the assembly may be carried out in the valve support or in the rinsing rod directly upstream of the nozzles. However, the assembly of one non-return valve for each rinsing rod in the transverse connector is particularly advantageous. Thus, it is ensured that fluid is equally prevented from exiting the receptacle and reaching the valve support when the rinsing rods are disassembled.

An alternative embodiment, wherein the actuating element is indirectly attached to the valve support and wherein the valve support, the valve and the actuating element are disposed on a common center axis, has proven to be particularly advantageous. Here, it is also advantageous if the center axis of the valve support coincides with the center of the rinsing rods. The center of the rinsing rods here is supposed to refer to the line which virtually forms the symmetrical axis between the rinsing rods.

In this context, it is particularly advantageous if the actuating element has a flat surface being advantageously designed as a compression disc, wherein it is of course possible to employ grids or rods. Here, the connection between the actuating element and the valve is produced with the aid of a rod-shaped transmission element which is equally disposed on the same common center axis. Hence, the transmission element is mounted in the valve support and the actuating element is attached thereto.

In the inventive device, the nozzles are not subjected to any restrictions, wherein both the size and the geometry are adapted at least to the desired quantity of used cleaning fluid and the frequency of the cleaning processes. In a first alternative, it is possible to integrate the nozzles into the rising rods. In this context, the nozzles are merely composed of openings which are in direct communication with the inner cross-section of the rinsing rods conducting the cleaning fluid. Alternatively, in a second alternative, it is possible that the nozzles are incorporated in the nozzle body, wherein the nozzle bodies are disposed such that the same can be mounted at the rinsing rods. The advantage of the second alternative can be seen in that an improved cleanability of the rinsing rods and the nozzle bodies is provided when the nozzle bodies are disassembled.

It is particularly advantageous if at least part of the nozzles are disposed above, in particular if part of the nozzles are disposed underneath a horizontal plane defined by the height of the actuating element. As a result, a portioning utensil can be pressed onto the actuating element and is rinsed along the sides by the nozzles which are disposed above the actuating element. The pressure of the discharged fluid can be maintained at a very high level due to said arrangement without any cleaning fluid being splashed into the environment, so that the cleaning result is markedly improved.

The arrangement of the nozzles per se should be selected in particular with a view to the shape and size of the portioning utensil, wherein it has proven to be particularly advantageous if several nozzles are disposed at each rinsing rod. For instance in the case of a portioning utensil having a spoon-shaped geometry with a correspondingly large bowl to which, as usual, a narrow shaft is attached, it is advantageous if the wider portion is rinsed with discharge openings arranged in a laterally offset pattern.

According to a particularly preferred exemplary embodiment, provision is furthermore made for several nozzles featuring different directions, being directed in particular toward the region of the actuating element disposed below the same. In this context, the directions can be defined by a horizontal and vertical angle, wherein it is possible to create rinsing regions which are more strongly flooded with the cleaning fluid.

The cross-sectional profile of a rinsing rod is basically immaterial. However, it has proven to be advantageous if the rising rod at least partly features a convex, concave and/or straight cross-section. Thus, just like in the first exemplary embodiment, a round rinsing rod can be created, wherein a flatly designed rinsing rod, in which the size and arrangement of the discharge opening are subjected to even less restrictions, is equally readily conceivable.

As such the spatial arrangement of the rinsing rods relative to each other is initially irrelevant and merely determines the region in which the portioning utensil is rinsed. However, it has proven to be a significant advantage if two or more rinsing rods are at least partly aligned in parallel to each other. In this way, a fork-like configuration known per se can be produced by arranging two rinsing rods in parallel to each other. A portioning utensil to be rinsed is disposed between the rinsing rods for the purpose of cleaning and is rinsed by the cleaning fluid simultaneously from the front and the back. It is readily apparent that the use of a correspondingly higher number of rinsing rods makes it possible to rapidly improve the rinsing result.

Hereinafter, an inventive cleaning device will be explained in greater detail with reference to different embodiments.

IN THE DRAWINGS

Figure 5:
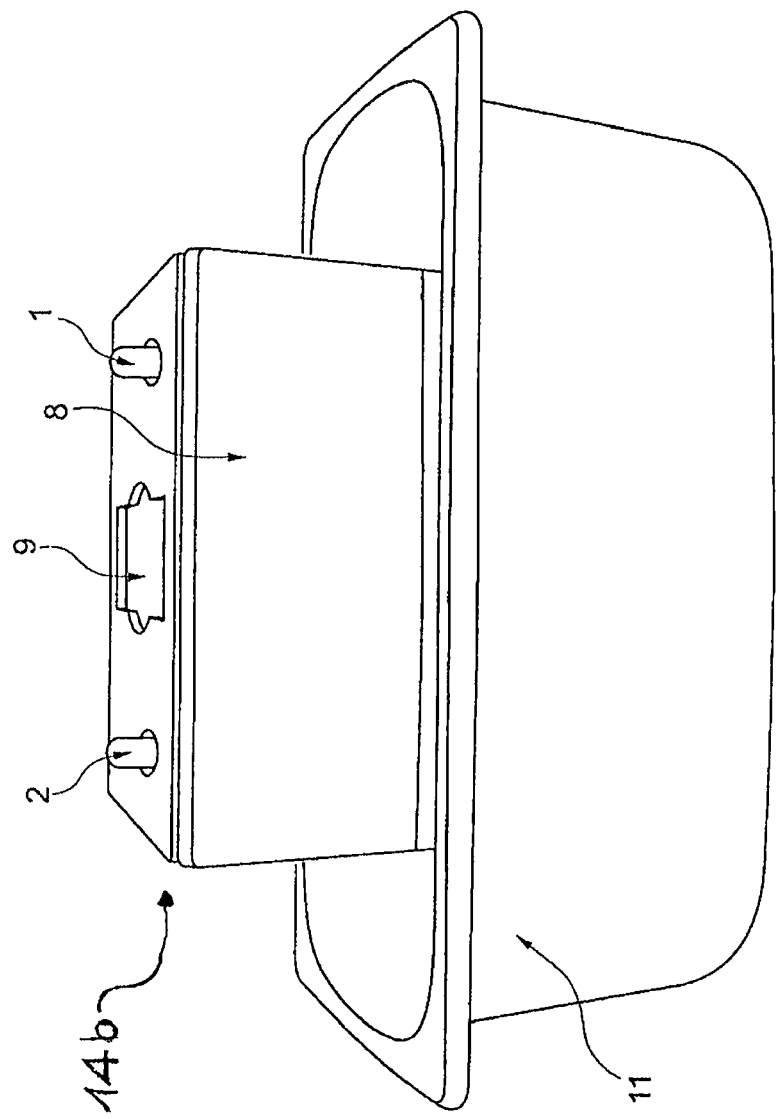
Figure 6:
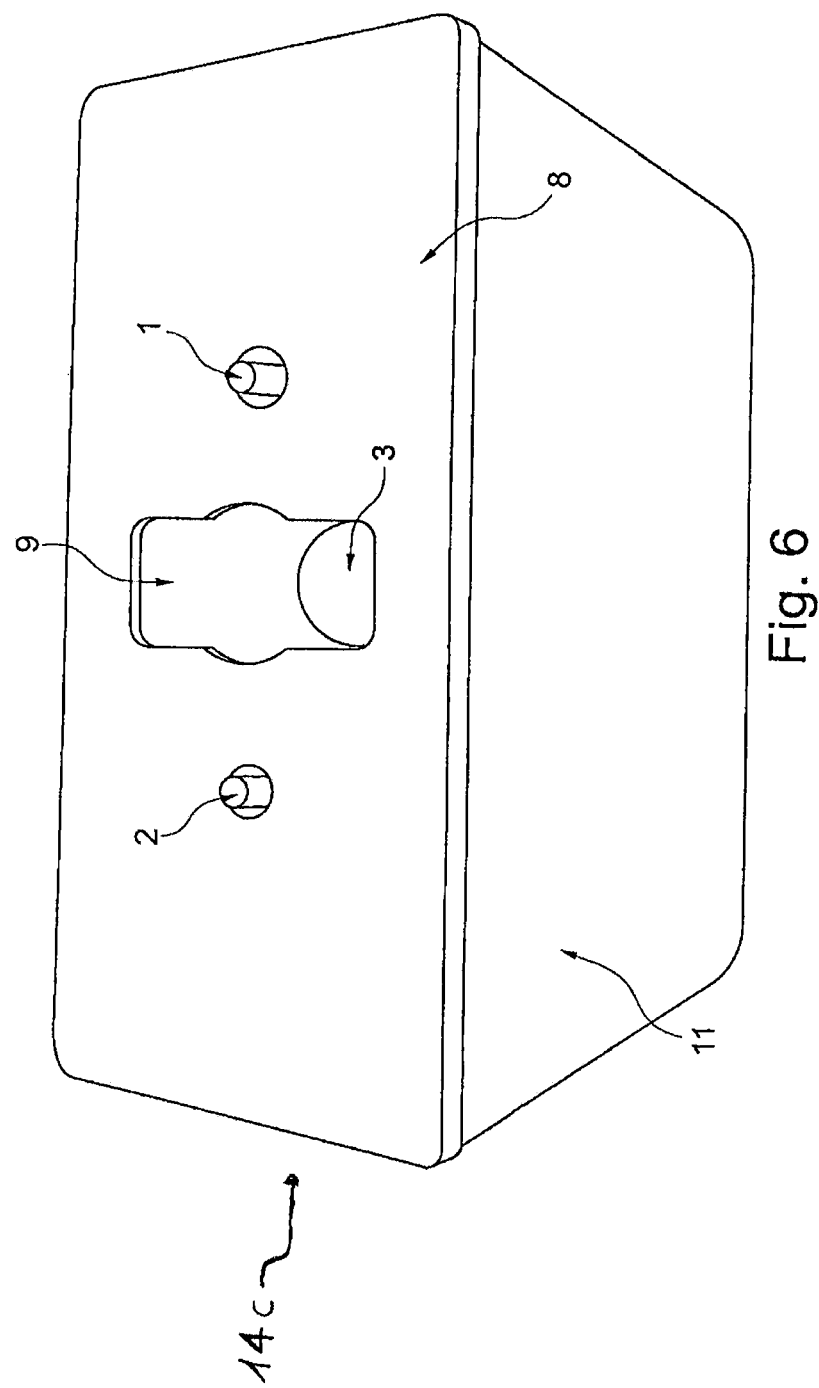
Figure 7:
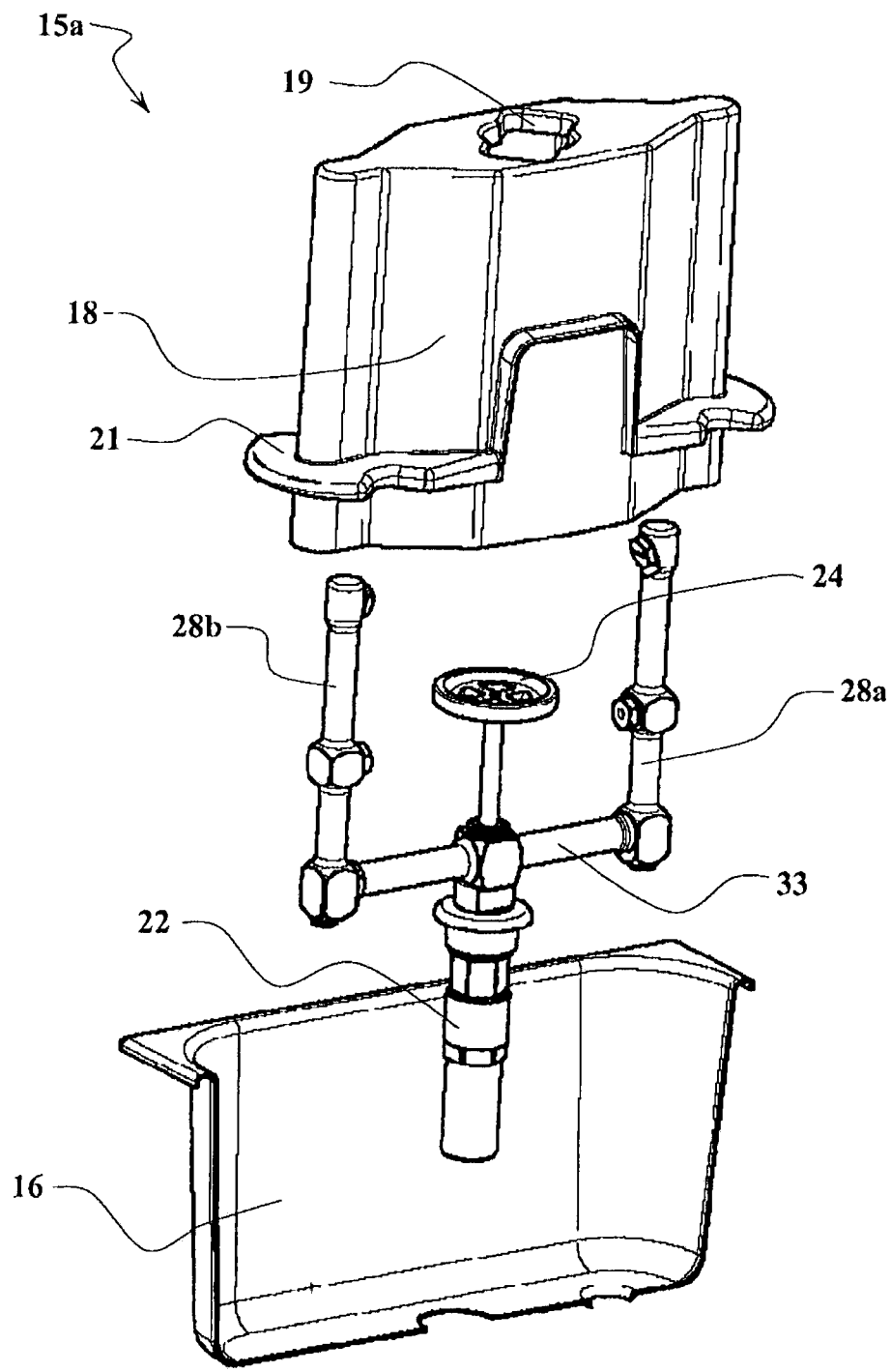
Figure 8:
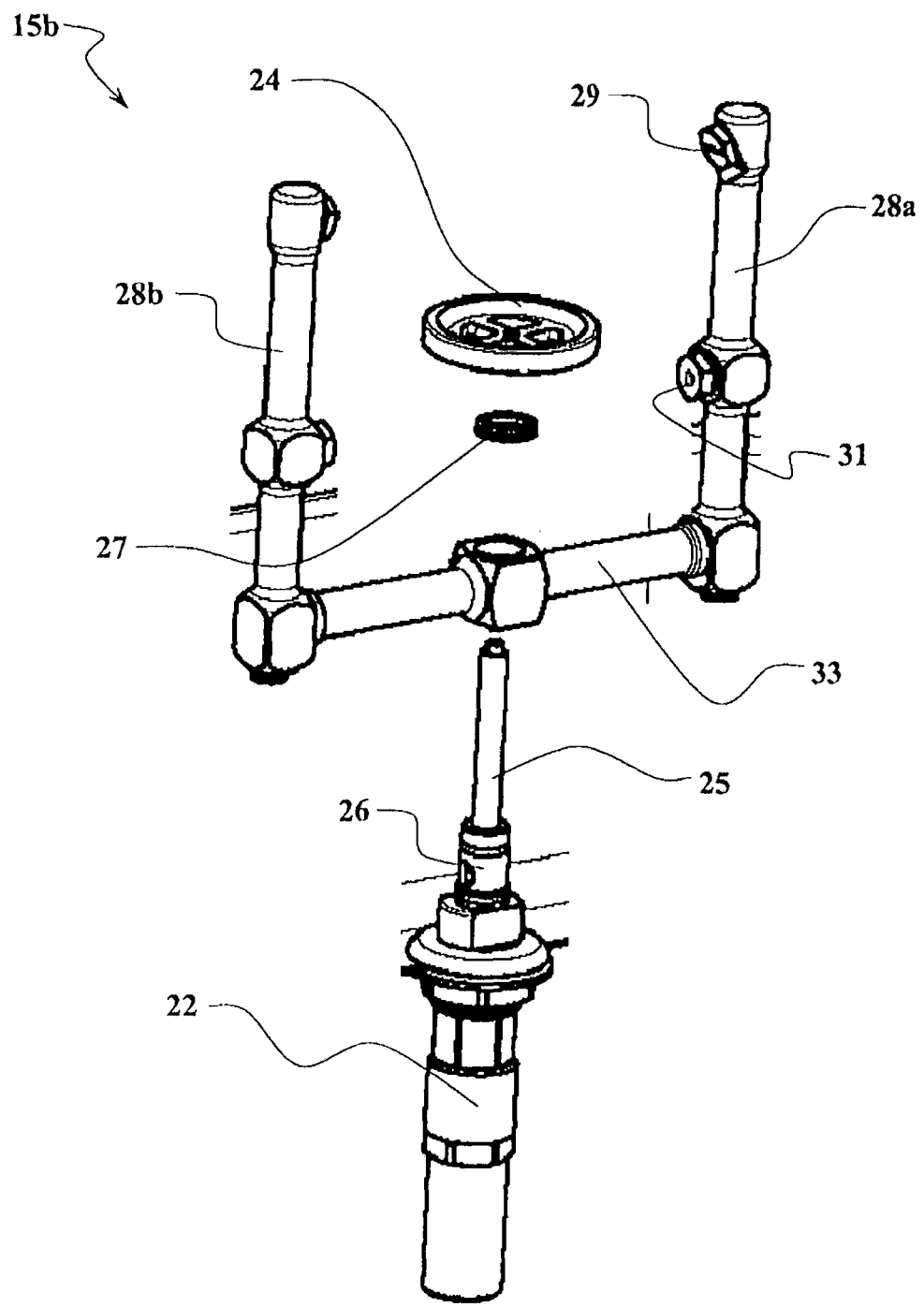
Figure 9:
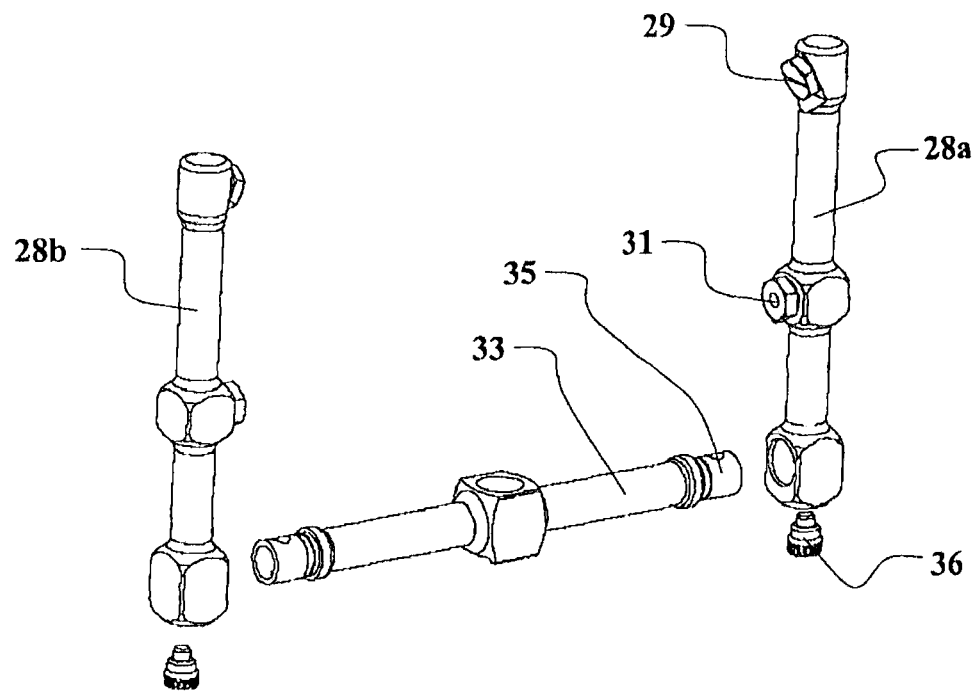
Figure 10:
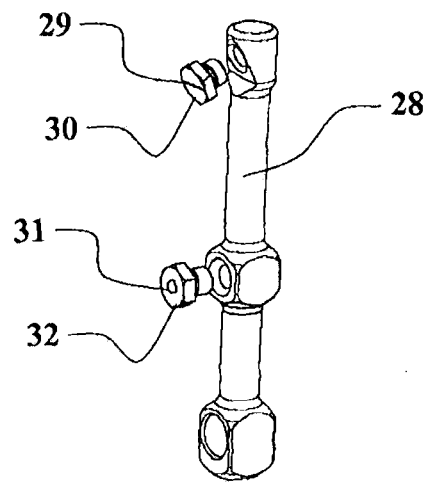
Figure 11:
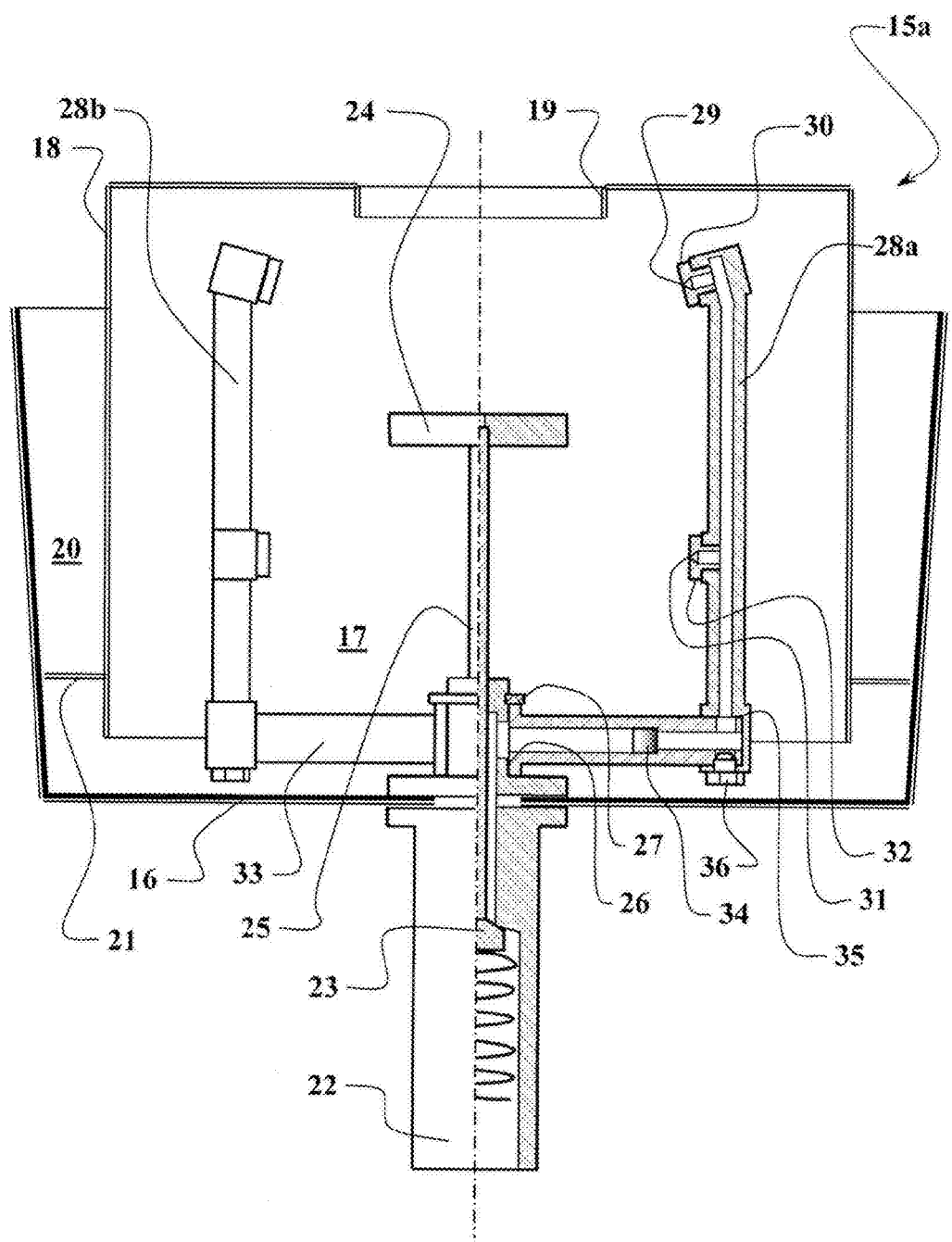

FIG. 5 illustrates the cleaning device 14b having the splash guard 08 arranged therein and being inserted into a receptacle 11;

FIG. 6 illustrates the cleaning device 14c having a splash guard 08 which is designed as a lid for a receptacle 11;

FIG. 7 illustrates a further alternative of a cleaning device 15a having a splash guard 18 disposed in a receptacle 16;

FIG. 8 illustrates a disassembly of the rinsing rods 28 having a transverse connector 33 in a cleaning device 15b;

FIG. 9 illustrates a disassembly of the rinsing rods 28 from the transverse connector 33 according to FIG. 8;

FIG. 10 illustrates a disassembly of the nozzle bodies 30, 32 from the rinsing rod 28 according to FIG. 8;

FIG. 11 illustrates a schematic cross-sectional view of the embodiment according to FIG. 7.

Figure 1:
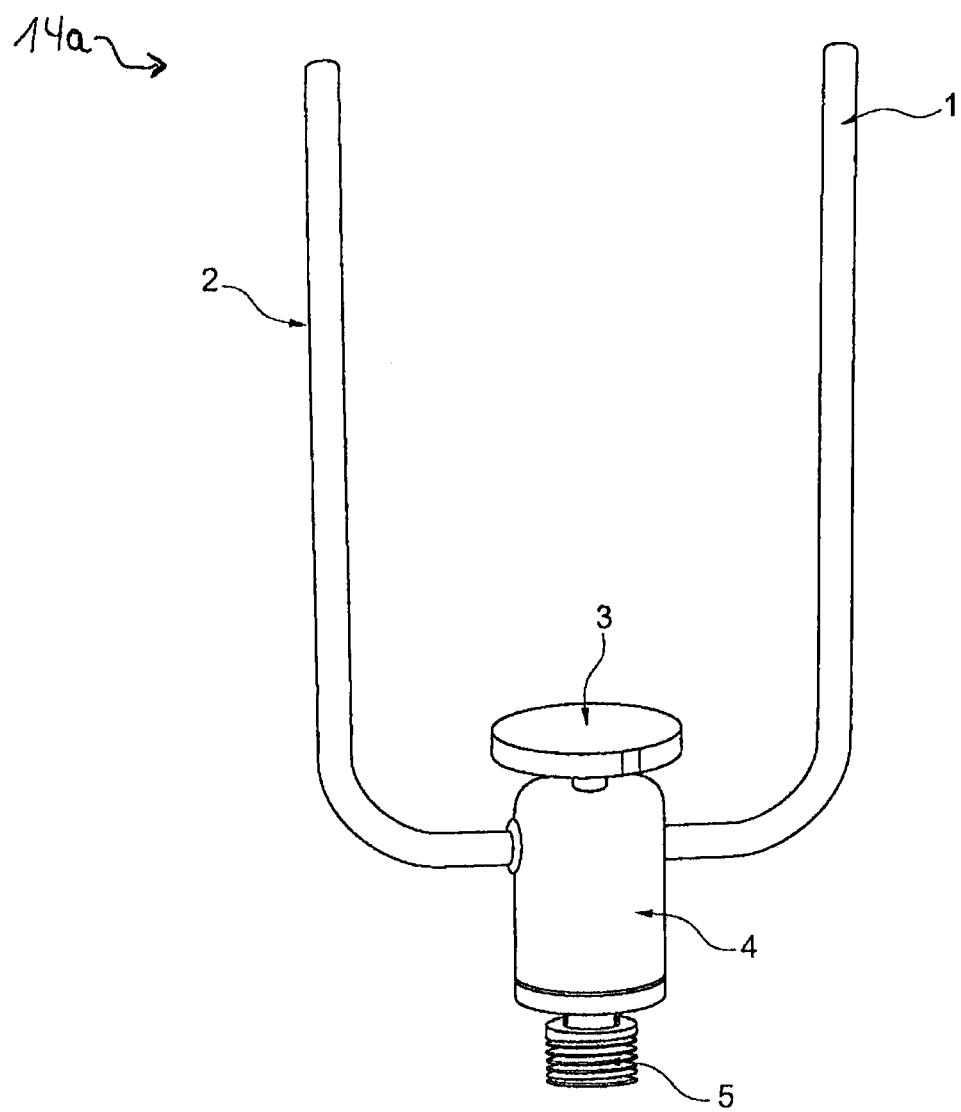
FIG. 1 illustrates a cleaning device 14a having two parallel rinsing rods 01, 02.

FIG. 1 illustrates the core of the cleaning device 14a in a first embodiment, wherein a first rinsing rod 1 and a second rinsing rod 2 are each curved by 90 degrees in the lower region and with this end are connected to a common valve support 4, so that starting from the common valve support 4, the first rinsing rod 1 and the second rinsing rod 2 extend upward in a fork-like configuration. In the upper region of the valve support 4, an actuating element 3 is disposed which controls a valve disposed in the valve support 4 by executing a pressing down movement or else a vertical movement. In the lower region, a cleaning connection 5 is formed for arrangement in a receptacle, which can be screwed to an inlet for the cleaning fluid for instance through a hole in the receptacle bottom.

Figure 2:
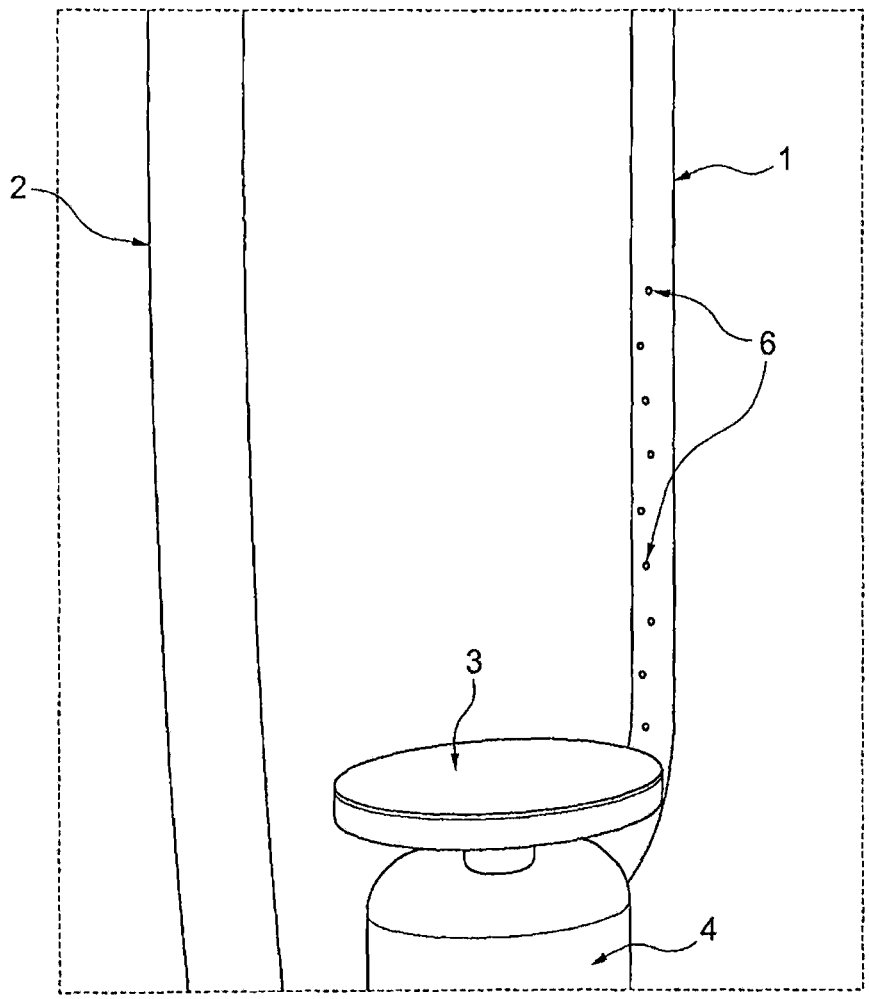
FIG. 2 illustrates a detailed view of a rinsing rod 01 according to FIG. 1.

FIG. 2 illustrates another perspective view of the cleaning device shown in FIG. 1, wherein again a first rinsing rod 1 and a second rinsing rod 2 are disposed at a common valve support 4. The valve within the valve support is controlled from above by an actuating element 3. The arrangement of several nozzles 6 in the first rinsing rod 1 is clearly apparent, wherein said nozzles are disposed next to each other so as to form a slightly wavy arrangement. Said eight nozzles 6, which are exemplarily shown and directly integrated in the rinsing rod 2, are also disposed in the second rinsing rod 2 in the opposite direction (not illustrated), so that a portioning utensil 7 to be rinsed pressing onto the actuating element 3 is rinsed by a cleaning fluid discharged from said nozzles 6.

Figure 3:
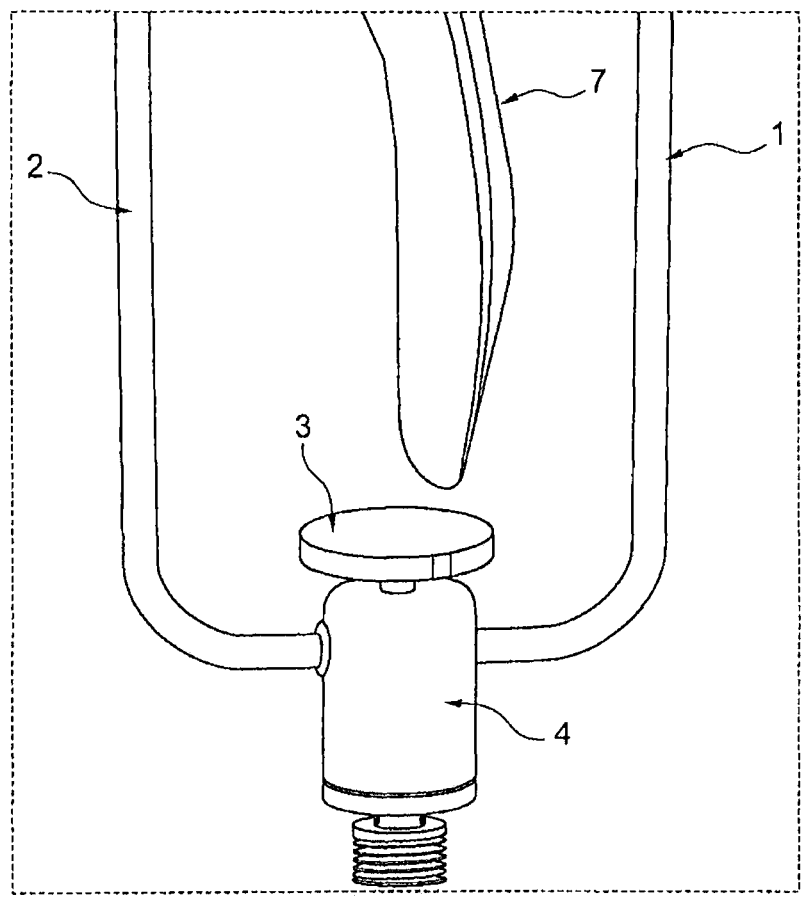
FIG. 3 illustrates the cleaning device 14a shortly before activation of the actuating element 03.

FIG. 3 illustrates the cleaning device 14a, wherein the functionality thereof is supposed to be illustrated such that the cleaning device 14a, being composed of a first rinsing rod 1, a second rinsing rod 2 and a valve support 4 and an actuating element 3, is activated by a portioning spoon 7 pressing from above onto the actuating element 3. By means of this measure, a valve being connected to the actuating element 3, which is disposed in the valve support 4, is controlled, so that a cleaning fluid is pressed into the rinsing rods 1, 2. The cleaning fluid is subsequently discharged through the nozzles 6 out of the rinsing rods 1, 2 and enters in particular the central region in which the portioning spoon 7 is located, and impurities adhering thereto, such as for instance ice cream, are rinsed off.

Figure 4:
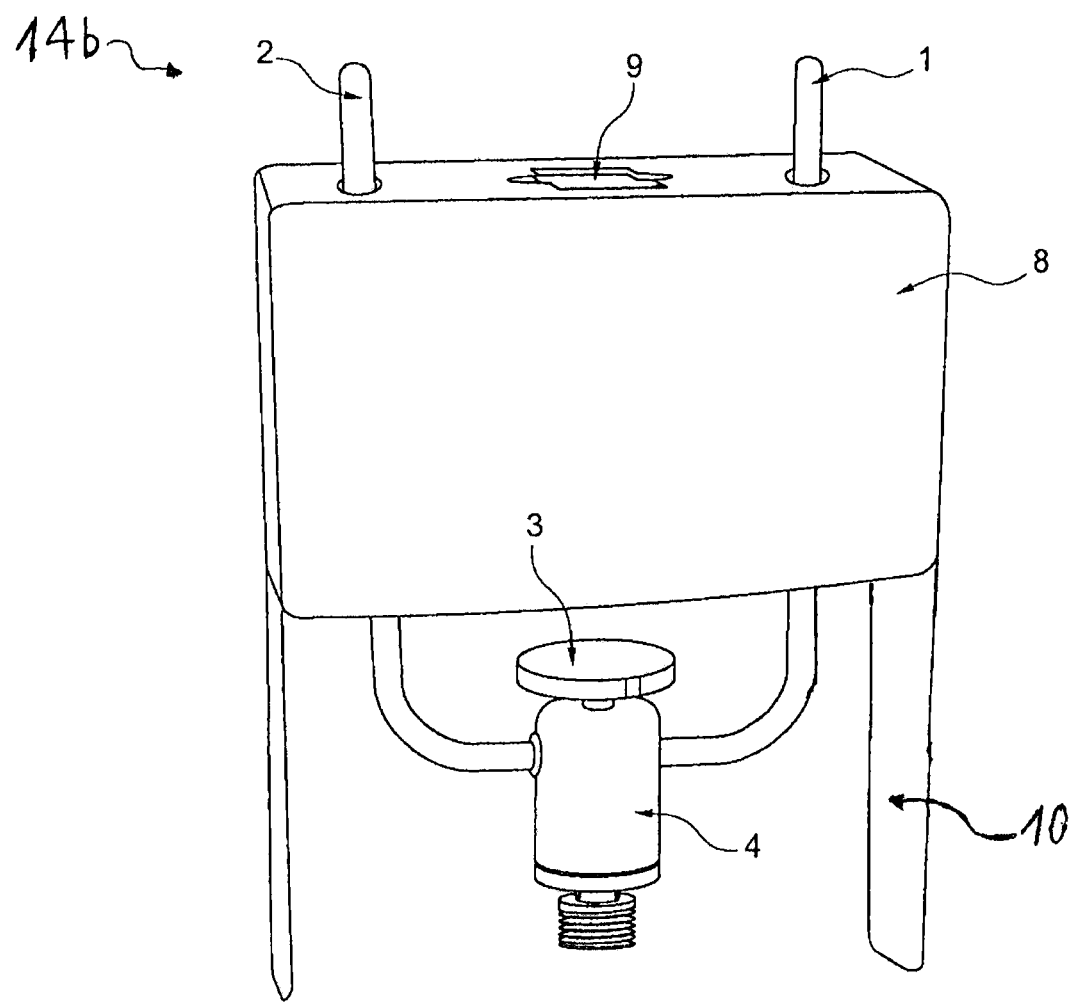
FIG. 4 illustrates the cleaning device 14b having the splash guard 08 arranged therein.

FIG. 4 illustrates the arrangement of a splash guard 8 at the previously described cleaning device 14b, wherein the splash guard 8 has an insertion opening 9 through which a portioning utensil 7 reaches the actuating element 3. The cleaning device 14b provides for the splash guard 8 having two recesses, by means of which it is firmly disposed at the first rinsing rod 1 and the second rinsing rod 2. The illustrated splash guard 8 further is designed with supporting elements 10 which also determine a height of the splash guard 8 being adapted to the portioning utensil.

FIG. 5 illustrates the cleaning device 14b, being composed of a rinsing unit and a splash guard 8 and being disposed in a receptacle, wherein the receptacle 11 is a conventional portioning utensil rinsing receptacle 11, in which, as shown in FIG. 4 and as is known for a water tap, the cleaning device 14b is screwed into the bottom of the receptacle 11 and to an inlet being disposed below the same. The cleaning device 14b, as already known, has a splash guard 8 which is centered with the aid of the rinsing rods 1, 2. Furthermore, the illustration shows that the splash guard 8 has an insertion opening 9 through which a portioning utensil reaches the actuating element 3 in order to start the rinsing process.

FIG. 6 illustrates another alternative of a splash guard 8, wherein the same is illustrated so as to be placed on a receptacle 11 in the form of a lid. Here again, the splash guard 8 is disposed at a first rinsing rod 1 and a second rinsing rod 2 via recesses and, as is clearly illustrated, has an insertion opening 9 having the actuating element 3 disposed below the same.

It is pointed out that the realization of the invention is not confined to the exemplary embodiments described in FIGS. 1 to 6 but rather a large number of alternatives are still equally possible. In particular, the shape and size of the rinsing rods, the actuating element as well as the splash guard may almost arbitrarily be adapted to the respective requirements and thus may deviate from the illustrated embodiments.

FIG. 7 illustrates another embodiment of an inventive cleaning device 15a. Moreover, a receptacle 16 being primarily used in the implementation is schematically illustrated in a half-sectional view. As is readily apparent, the receptacle 16 has a centric center axis which conforms to the center axis of the cleaning device 15a. As is schematically illustrated in this view, the valve support 22 is disposed above the receptacle 16, wherein it is readily apparent for the skilled person that the assembly is intended to be carried out at the ledge of the valve support 22. The advantageous transverse connector 33, through which the cleaning agent can be conducted from the valve support 22 to the two rising rods 28a, 28b which are in turn mounted at the transverse connector 33, is push-fitted onto the valve support 22. In this embodiment, furthermore a disc-shaped actuating element 24 is illustrated, which is in communication with the valve 23 in the valve support 22 via a transmission element 25.

Moreover, in this exemplary embodiment, provision is made for a splash guard 18 for the purpose of protection against splashing cleaning fluid and which covers the rinsing rods 28 and is placed in the receptacle 16. It is apparent how the shape of the splash guard 18 is adapted to the position of the rinsing rods 28. Moreover, an insertion opening 19 is disposed centrally at the top in the splash guard 18 and has a collar which points to the inside. Equally, a ledge is apparent, which on both sides of the rinsing rods 28 forms supporting elements 21 and on which, as is apparent, the portioning utensil can be mounted within the receptacle 16 so as to be separated from the cleaning chamber 17 and so as to be at a distance from the bottom of the receptacle 16.

FIG. 8 illustrates an embodiment of a cleaning device 15b according to FIG. 7 but without a splash guard. Moreover, in this illustration, the removal of the transverse connector 33 together with the rinsing rods 28 from the valve support 22 is schematically illustrated. For this purpose, in this embodiment it is necessary to detach the disc-shaped actuating element 24 from the rod-shaped transmission element 25. Then, a thread lock can be removed from the valve support by hand. Now, it is possible to detach the transverse connector 33 from the push-fit connection 26 at the valve support and to lift it out of the receptacle.

FIG. 9 shows the separation of the rinsing rods 28 from the transverse connector 33 according to the embodiment of FIG. 8. A push-fit connection 35 is equally provided between the transverse connector 33 and the rinsing rod 28, which is here in each case secured against detachment by means of a thread lock 36.

FIG. 10 in addition illustrates the removal of the nozzle bodies 30 and 32 from the rinsing rod 28. Here, the nozzles 29, 31 are incorporated into the nozzle bodies. As is readily apparent, the nozzle bodies feature different spray directions which are specifically directed to the portioning utensil to be cleaned.

Finally, FIG. 11 is supposed to illustrate the functionality of an alternative of the inventive cleaning device 15a. The valve support 22 is mounted in a hole in the receptacle 16. It is apparent for the skilled person that an inlet leading to the valve support 22 below the receptacle is required. The valve 23 is disposed within the valve support 22 and can be switched via the transmission element 25 by means of the actuating element 24. The transverse connector 33 is push-fitted onto the valve support 22 within the receptacle 16. The push-fit connection 26 is secured against unintentional detachment by means of a thread lock 27. In a comparable manner, a rinsing rod 28 is in each case push-fitted onto the transverse connector 33 in the case of a push-fit connection 35. This connection is equally secured against detachment by means of a thread lock 36. The configuration of said thread locks 27 and 36 is advantageously selected such that the same can be actuated by hand without the need for making use of a tool. Moreover, two nozzles 29 and 31 are schematically illustrated in the nozzle bodies 30 and 32 in the respective rinsing rods 28.

The splash guard 18 is largely disposed in the receptacle 16 so as to surround the rinsing rods 28. Hence, the splash guard 18 forms the cleaning chamber 17. The storage chamber 20, in which the clean portioning utensil can be stored on supporting elements 21, is arranged so as to be separated from the cleaning chamber by the wall of the splash guard 18. Thus, it is ensured that the clean portioning utensil is not subsequently contaminated again.

To make sure that fluid is prevented from flowing back into the valve support 22 through the nozzles 29, 31 and the rinsing rods 28 when the receptacle 16 is partially filled, or from flowing directly through the transverse connector 33 when the rinsing rods are removed, provision is made for a non-return valve 34 in the transverse connector 33 for each rinsing rod 28. This ensures a largely free flow of the cleaning fluid toward the nozzles 29, 31 and prevents a backflow of fluid from the receptacle 16.

LIST OF REFERENCE NUMERALS

01 First rinsing rod
02 Second rinsing rod
03 Actuating element
04 Valve support
05 Cleaning connection
06 Nozzle
07 Portioning utensil
08 Splash guard
09 Insertion opening
10 Supporting elements
11 Receptacle
12
13
14 Cleaning device
15 Cleaning device
16 Receptacle
17 Cleaning chamber
18 Splash guard
19 Insertion opening
20 Storage chamber
21 Supporting elements
22 Valve support
23 Valve
24 Actuating element/disc
25 Transmission element/compression rod
26 Push-fit connection at valve support
27 Thread lock at valve support
28 Spray rod
29 Upper nozzle
30 Nozzle body of upper nozzle
31 Lower nozzle
32 Nozzle body of lower nozzle
33 Transverse connector
34 Non-return valve
35 Push-fit connection at transverse connector
36 Thread lock at transverse connector

The invention claimed is:

1. A cleaning device for a portioning utensil used for portioning ice cream, said cleaning device comprising:
   a receptacle;
   a valve support mounted in an opening of the receptacle, said valve support supporting a valve;
   at least two rinsing rods disposed in said receptacle and in fluid communication with the valve;
   nozzles located at the rinsing rods;
   an actuation mechanism controlling the flow of cleaning fluid from the valve support into the rinsing rods with the aid of the valve;
   a splash guard received in the receptacle and having a splash guard wall surrounding said rinsing rods, said splash guard wall defining a cleaning chamber within the receptacle in which the utensil is cleaned, wherein the splash guard has an insertion opening for insertion of the portioning utensil, the rinsing rods being received within the cleaning chamber can be detached from the valve support; and
   a transverse connector which conducts the cleaning fluid is disposed between the valve support and the rinsing rods, wherein the transverse connector is detachably affixed to the valve support and the rinsing rods are detachably affixed to the transverse connector.

2. The cleaning device according to claim 1, in which the rinsing rods received within the cleaning chamber can be detached from the valve support.

3. The cleaning device according to claim 1, in which the insertion opening has a collar which points into the cleaning chamber and in the opening cross-section is adapted to the portioning utensil to be cleaned.

4. The cleaning device according to claim 1, in which the splash guard includes a ledge extending from the splash guard wall toward a receptacle wall and above a bottom wall of the receptacle, said ledge defining a utensil storage area within the receptacle, separated from the cleaning chamber, and at a distance from the bottom of the receptacle.

5. The cleaning device according to claim 1, in which the splash guard includes suspension elements on which the portioning utensil can be stored in an essentially suspended fashion.

6. The cleaning device according to claim 4, in which the ledge is a supporting elements on which the portioning utensil can be stored in an essentially vertical fashion.

7. The cleaning device according of claim 1, in which the splash guard partly has a shape which conforms to the inside of the receptacle and is centered in the receptacle.

8. The cleaning device according to claim 1, in which the splash guard has at least two recesses, wherein the respective end of a rinsing rod can be accommodated in said recesses, and a centering of the splash guard relative to the rinsing rods is effected.

9. The cleaning device according to claim 1, in which the connection of the rinsing rod to the transverse connector and/or the transverse connector to the valve support is carried out with the aid of a push-fit connection which is secured by a thread lock.

10. The cleaning device according to claim 1, in which a backflow of the cleaning fluid is prevented by the nozzles via at least one non-return valve.

11. The cleaning device according to claim 1, in which the valve support supporting the valve and the actuating element are arranged on a central axis which is formed as the center of the rinsing rods, wherein the actuating element has a flat surface, and wherein the actuating element switches the valve via a rod-shaped transmission element and is mounted at the valve support by means of said transmission element.

12. The cleaning device according to claim 1, in which each rinsing rod contains at least two detachable nozzles, wherein at least two nozzles of one rinsing rod feature at least one of a different spraying direction and a different spraying manner.

13. A cleaning device for a portioning utensil used for portioning ice cream, which can be inserted into a receptacle, said cleaning device comprising:
- a receptacle;
- a valve support mounted in an opening of the receptacle, said valve support supporting a valve;
- at least two rinsing rods disposed in said receptacle and in fluid communication with the valve;
- nozzles located at the rinsing rods;
- an actuation mechanism controlling the flow of cleaning fluid from the valve support into the rinsing rods with the aid of the valve;
- a splash guard received in said receptacle and defining a cleaning chamber within the receptacle receiving the rinsing rods, and in which the utensil is cleaned, and the rinsing rods received within the cleaning chamber can be detached from the valve support; and
- a transverse connector which conducts the cleaning fluid is disposed between the valve support rind the rinsing rods, wherein the transverse connector is detachably affixed to the valve support and the rinsing rods are detachably affixed to the transverse connector.

14. The cleaning device according to claim 13, in which a backflow of the cleaning fluid is prevented by the nozzles via at least one non-return valve.

15. The cleaning device according to claim 13, in which the valve support supporting the valve and the actuating element are arranged on a central axis which is formed as the center of the rinsing rods, wherein the actuating element has a flat surface, and wherein the actuating element switches the valve via a rod-shaped transmission element and is mounted at the valve support by means of said transmission element.

16. The cleaning device according to claim 13, in which each rinsing rod contains at least two detachable nozzles, wherein at least two nozzles of one rinsing rod feature a at least one of a different spraying direction and a different spraying manner.

17. The cleaning device according to claim 13, in which the splash guard delimits the cleaning chamber at least partly and has an insertion opening for insertion of the portioning utensil.

18. The cleaning device according to claim 17, in which the insertion opening has a collar which points into the cleaning chamber and in the opening cross-section is adapted to the portioning utensil to be cleaned.

19. The cleaning device according to claim 17, in which the splash guard includes a ledge extending from the splash guard wall toward a receptacle wall and above a bottom wall of the receptacle, said ledge defining a utensil storage area within the receptacle, separated from the cleaning chamber, and at a distance from the bottom of the receptacle.

20. The cleaning device according to claim 17, in which the splash guard partly has a shape which conforms to the inside of the receptacle, in particular in the region of the supporting elements, and is centered in the receptacle.

21. The cleaning device according to claim 17, in which the splash guard has at least two recesses, wherein the respective end of a rinsing rod can be accommodated in said recesses, and a centering of the splash guard relative to the rinsing rods is effected.

* * * * *

UNITED STATES PATENT AND TRADEMARK OFFICE
CERTIFICATE OF CORRECTION

| | | |
|---|---|---|
| PATENT NO. | : 9,044,130 B2 | Page 1 of 1 |
| APPLICATION NO. | : 13/390660 | |
| DATED | : June 2, 2015 | |
| INVENTOR(S) | : Bernd Lölsberg | |

It is certified that error appears in the above-identified patent and that said Letters Patent is hereby corrected as shown below:

In the claims,
Column 12, line 38
"elements" should be --element--

Signed and Sealed this
Fifth Day of January, 2016

Michelle K. Lee
*Director of the United States Patent and Trademark Office*